March 28, 1950 L. H. TAYLOR 2,502,291
METHOD FOR ESTABLISHING ELECTRICAL CONNECTIONS
IN ELECTRICAL APPARATUS
Filed Feb. 27, 1946 6 Sheets-Sheet 1

Inventor
LAWRENCE H. TAYLOR
By John Q. Brady
Attorney

March 28, 1950 — L. H. TAYLOR — 2,502,291
METHOD FOR ESTABLISHING ELECTRICAL CONNECTIONS IN ELECTRICAL APPARATUS
Filed Feb. 27, 1946 — 6 Sheets-Sheet 2

Inventor
LAWRENCE H. TAYLOR
By John B. Brady
Attorney

Inventor
LAWRENCE H. TAYLOR
By John B. Brady
Attorney

March 28, 1950 L. H. TAYLOR 2,502,291
METHOD FOR ESTABLISHING ELECTRICAL CONNECTIONS
IN ELECTRICAL APPARATUS
Filed Feb. 27, 1946 6 Sheets-Sheet 4

Inventor
LAWRENCE H. TAYLOR
By John B. Brady
Attorney

March 28, 1950 L. H. TAYLOR 2,502,291
METHOD FOR ESTABLISHING ELECTRICAL CONNECTIONS
IN ELECTRICAL APPARATUS
Filed Feb. 27, 1946 6 Sheets-Sheet 5

Inventor
LAWRENCE H. TAYLOR
By John B. Brady
Attorney

March 28, 1950  L. H. TAYLOR  2,502,291
METHOD FOR ESTABLISHING ELECTRICAL CONNECTIONS
IN ELECTRICAL APPARATUS
Filed Feb. 27, 1946  6 Sheets-Sheet 6

Inventor
LAWRENCE H. TAYLOR

By John B. Brady
Attorney

Patented Mar. 28, 1950

2,502,291

UNITED STATES PATENT OFFICE 2,502,291

METHOD FOR ESTABLISHING ELECTRICAL CONNECTIONS IN ELECTRICAL APPARATUS

Lawrence H. Taylor, New York, N. Y.

Application February 27, 1946, Serial No. 650,664

3 Claims. (Cl. 29—155.5)

My invention relates broadly to a fabrication of electrical apparatus and more particularly to an improved method for producing electrical apparatus inexpensively on a mass production scale.

Production of electronic equipment now must be planned so as to arrange components on a chassis in a manner that permits use of production line techniques. This requirement often lowers the electrical efficiency and usually is the cause of much higher production spoilage because of the human factor involved in the actual assembly work. If units are planned so as to realize maximum electronic performance they are prohibitively expensive and complicated for mass production.

One of the objects of my invention is to provide an improved method of manufacturing electrical apparatus on a mass production scale in which the tedious and time consuming soldering processes customarily employed in the art are eliminated and soldered connections established throughout a complicated electrical unit by a baking, spraying, dipping or heating process.

Another object of my invention is to provide an improved method of mass production for electronic assembly systems in which relatively unskilled labor may be employed in the production of complicated electrical apparatus with accompanying low manufacturing costs.

Still another object of my invention is to provide a method of production and construction of electrical apparatus in which testing of the apparatus may be rapidly conducted by a single continuity test without the necessity of employing time consuming and antiquated methods of circuit prods requiring considerable time and substantial skill on the part of the operative.

Still another object of my invention is to provide a method of assembly for electrical apparatus in which repair of the apparatus may be quickly and inexpensively effected from time to time without discarding operative apparatus units and without performing many of the unsoldering and soldering operations now essential in effecting apparatus repairs.

A further object of my invention resides in an improved method of assembly and electrical connection of electrical apparatus employing a multiplicity of circuit components by use of a specially prepared lamination formed from insulation material and carrying preformed electrical circuits thereon to which electrical connections may be established from circuit components through specially prepared pin elements having means for flowing solder therefrom into the prepared circuit elements in certain of the laminations by a heating, baking, spraying or dipping process.

A still further object of my invention is to provide an arrangement of prepared sheets of flat insulation material carrying preformed circuit elements thereon or sandwiched between these insulation sheets and apertured at certain registrable positions for the passage of pin members carrying a metallic coating of low temperature melting point, such as solder, for effecting a flow of the solder uniformly from the pins into the conductive coatings of the laminations under conditions of heating, baking, spraying or dipping.

Other and further objects of my invention reside in a production process employing special means for interconnecting circuit components through preformed circuit patterns carried by laminated sheets stacked in superimposed relation as set forth more fully in the specification hereinafter following by reference to the accompanying drawings in which:

My invention is particularly directed to the mass production of electronic apparatus of complicated design for decreasing manufacturing costs, simplifying assembly of the apparatus and speeding up production. I provide a multiplicity of laminated sheets, each formed from insulation material and carrying thereon a part of the electrical circuit required between the various circuit elements or carrying no parts of the circuit but providing insulation or shielding. These circuit elements adhere to the surface of the sheet of insulation material and allow the laminations of insulation material to be stacked in superimposed arrangement for the passage therethrough of transverse pins. Apertures for the passage of these pins are prearranged in the surfaces of the sheets of laminated material and the apertures so registered and aligned so that the transversely extending pins may be projected therethrough and establish wiping electrical connection with the aligned conductive surface coatings on the superimposed laminations. Each juncture of the circuit elements with a transverse pin is provided with a charge of solder or other metal of low melting point, which charge of metal may be a coating on the circuit elements, a coating on or in the transverse pin, and/or a separate piece of such metal positioned at the point of intended electrical connection. Upon the application of heat the metal of low temperature characteristic carried by the transverse pins is caused to flow into the junction between the transverse pins and the conductive coatings on the laminations establishing circuit paths of high electrical conductivity. Thus the electrical apparatus unit may be completely electrically connected by a heating or baking process causing the electrical circuit to be established through the laminated sheets and conductive pins.

I have found my invention applicable to the mass production of electrical equipments which normally require intricate soldering of many separate circuit elements. By the arrangement of my invention all of the circuit elements are simultaneously soldered in a short time period after rapid assembly which may be accomplished by relatively unskilled labor, with improvement in the precision of assembly.

The assembly process of my invention is particularly desirable from the viewpoint of subsequent repair and testing of the circuit system as I provide special means for locating and removing deteriorated circuit components and re-establishing connection of replacement parts without derangement through means readily connected to the transverse pins, which utilize all the advantages and improvements heretofore illustrated for original assembly.

The circuits may be applied to the laminations by the following various methods:

1. By stamping out the desired electrical paths and either applying them to sheets of insulating material, or between sheets of insulating material.

2. By printing conducting paths as desired on insulating sheets as required.

3. By deposit of conducting substance in the desired patterns on nonconducting sheets, such deposit being made galvanically.

4. By deposit of conducting substance in the desired patterns by spraying or hot dip applications to nonconducting sheets through a mask or stencil permitting deposit only where desired. Molten metal spray to be used.

5. By the etching out of the undesired portions of a conducting sheet first applied to an insulating sheet, such as the photographic, metal-chromate and gelatin, process of engraving.

6. By pouring metal into a suitably indented matrix of nonconductive material causing the metal coating to be deeper along certain desired paths than elsewhere. The removal by planing or other cutting action of the top layer would leave only the conducting metal in the indentation to serve as the desired conducting paths.

7. By application of conducting material in ribbon form with suitable adhesive to hold the conducting strips respectively in place until laminations are clamped.

8. By the cutting of over-size holes and/or separating cuts in a sheet of conducting material applied to a sheet of nonconducting material. This permits electrical connection only between binding posts contacting the conducting sheet, or segment of that sheet, designed to effect electrical connection between the reference binding posts.

9. By casting or otherwise suspending long sheets of conducting material in a nonconducting substance in order that the end view of this casting would show the conducting and nonconducting materials desirably arranged in reference to one another. By cutting thin sheets from the end of this casting and placing such sheets between nonconducting sheets desirable laminations would result.

10. By fabricating the circuits out of metal sheets and sandwiching them between insulation sheets with indexed holes to receive the transverse members.

There are very distinct advantages arising out of the use of the system of my invention which may be summarized as follows:

1. Faster manufacture due to elimination of hand soldering work.

2. Cheaper manufacture due to reduction of labor on assembly, i. e., machine work to replace hand work.

3. Better performance of each unit because the length of connection (resistance) is more uniform between components (exact resistances in circuits are more predictable) and the circuits in a production run are predetermined.

4. Better performance of each unit because the geometric arrangement of the wiring circuit is more precise to insure maximum elimination of stray fields.

5. Has greater advantages in television circuits than in sound broadcast for the tolerances are more severe in television and there is less distortion allowable in video reception than in audio reception and points 3 and 4 serve to insure best possible fidelity.

6. Circuit system adapts most conveniently to testing machines designed to test all circuits automatically at one time.

7. Repair of circuit is facilitated, and testing may be most easily done on pins projecting through the bottom of the laminations.

8. Repair is more likely to restore the unit to original performance as it is difficult to disturb the geometric wiring pattern, and non-standard parts are more difficult to wire into the circuit.

9. The construction greatly facilitates the sealing of the unit against moisture, dust, corrosion, etc. Also, repair of the unit may be made with small and easily correctable damage to the moisture proof seal of the wiring circuit.

10. The lamination system greatly facilitates the connection of component parts on a mass production basis by the spraying of the connecting points when assembly has been completed.

11. The wiring circuit lends itself most readily to plug in connection of components from the top, which will facilitate repair by making it possible to interchange parts without removing chassis from the frame or requiring a complex unsoldering job that might be encountered in removing a basic component from a standard chassis.

12. The simplified plug-in assembly of components will permit the use of comparatively unskilled labor in maintenance work where the simple method is employed of exchanging good for doubtful parts until the equipment is again operative. At the end of each day the parts removed can be tested and good components placed back in the replacement stock for future use.

13. Less skilled labor may be employed in manufacture due to the fact that more of the close tolerance work is done by machine. Human error factor is reduced and less chance for error is possible by the improved final testing system that may be employed with this construction.

14. Accessibility of wiring connections makes for ease of repair work both in testing for repair and in replacement of parts.

15. One or more laminations can act as a shielding to insulate component from the fields of wiring circuits or to separate different circuits where the fields of one or both might undesirably affect the performance. All shield can be attached to the shielding lamination by pins the same as the circuit components.

16. Solder, or any other low temperature melting point metal or alloy, may be held on either the laminated circuit elements or on the transverse members, thus flowing from one to the other, or inserted as a sleeve on the transverse member, flowing, to both the laminated circuit elements and transverse member when melted.

17. Circuit components such as capacitors, resistors, or inductances may be constructed so as to include the transverse members as their terminals.

Figure 1:
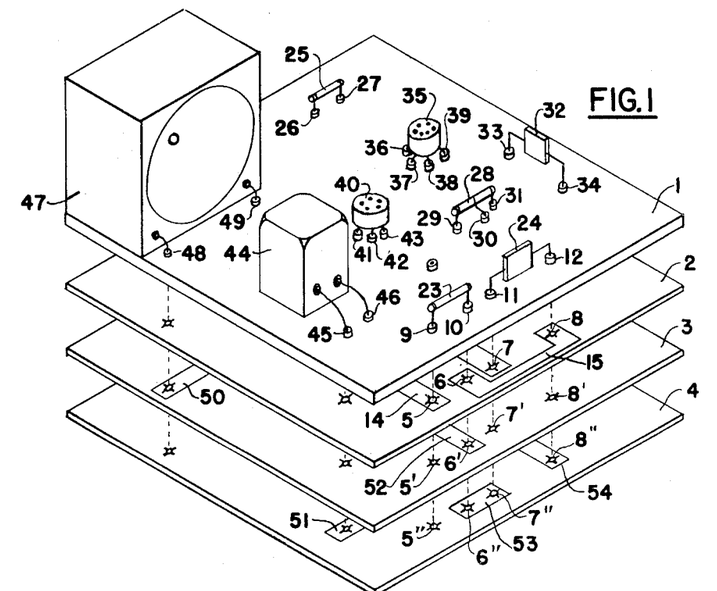
Figure 1 is a perspective view of a fragmentary section of a multiplicity of perforated laminations of insulation material, each of which carries circuit elements thereon registerable through perforations with pin members connectible with circuit components.

Referring to the drawings in detail, Fig. 1 shows the laminated structure of my invention with the layers or plies thereof sufficiently separated in super-imposed relation to illustrate the method of establishing electrical connection between circuit components in accordance with my invention. The plate of insulation material 1, such as, "Bakelite," or other electrical insulation material of substantial thickness, serves as a base support for the circuit components. Layers or plies of similar material, but of smaller thickness are arranged immediately adjacent the supporting layer or ply 1 as represented at 2, 3, and 4. The layer or ply 1 serves in the nature of a supporting base, backed up by multiple layers or plies 2, 3, and 4. Ply 1 can be omitted where the electrical circuit permits, as the other plies are strong enough to be mechanically self-supporting. The layer or ply 2 has been illustrated in fragmentary form in Figs. 2–5, having perforations extending therethrough at 5, 6, 7, 8, etc., aligned or registered with similarly spaced perforations 5′, 6′, 7′ and 8′ in layer or ply 3 and 5″, 6″, 7″ and 8″ in layer or ply 4. These perforations are formed in a very special manner. They may be punched or pressed out from the laminated sheet material or the laminated sheets may be molded with the aligned perforations therein, or a solid sheet of material may be longitudinally sawed by use of a multiple spaced saw device after the transverse perforations are formed therein so that when the several layers or plies are super-imposed the perforations align with each other.

Figure 2:
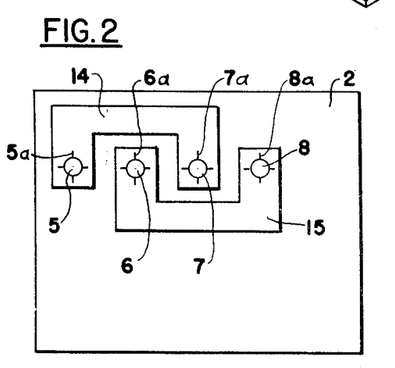
Fig. 2 is a fragmentary portion of one of the laminations of insulation material illustrating the arrangement of circuit elements thereon.

In Fig. 2 I have illustrated the perforations as having radially disposed slits 5a, 6a, 7a, 8a, etc., slotted through the insulation sheet 2 to facilitate the seepage of the metallic bonding material, and to facilitate the electrical wiping effect, as will be hereinafter more fully explained for establishing connection between conductive members illustrated at 9, 10, 11 and 12, etc., with the circuit connectors which are painted, deposited, plated, printed, sprayed, or otherwise formed on the insulation sheet, such as, the layer or ply illustrated at 2, and designated for purposes of illustration as the metallic bonds 14 and 15 in Fig. 2. If the perforation can be accurately stamped and protected from deformation, an unbroken edge to the hole will grip the transverse member of larger diameter more strongly. Slits or other breaks in the perforation's edge assure multiple contacts with the pin in event of malformation, permitting wider tolerances and the use of less skilled labor in the overall task.

Figure 3:
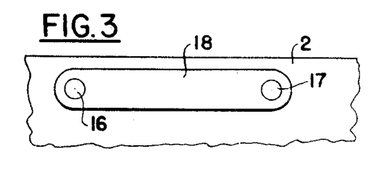
Fig. 3 represents a fragmentary portion of one of the laminated sheets of insulation material and showing one method of depositing a conductive circuit connection thereon for connection by the transversely projecting pins through the laminations.

In Fig. 3 I have shown the perforations through the layer or ply insulation material 2 formed at spaced intervals at 16 and 17 with the conductive connector deposited therebetween on the insulation 2 at 18. In order to establish electrical connection between the transverse conductive members, such as, pins 9, 10, 11 or 12, metal is caused to flow from the pins which extend through the superimposed layers or plies to form a bonding connection with opposite ends of the connector 18. In Fig. 3 the perforations are circular to substantially conform with the sections of the transversely extending pins which project through the superimposed layers or plies of insulation material.

Figure 4:
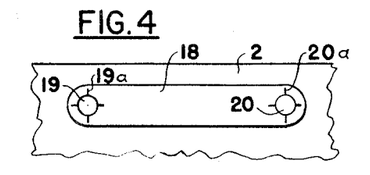
Fig. 4 shows a modified method of preparing the laminated sheet with the conductive coating thereon and the means provided for facilitating interconnection between the transverse pin surface and the conductive coating.

In Fig. 4 I have illustrated the conductive connector 18 with the perforations 19 and 20 formed through the ends thereof, and each slitted at 19a and 20a for facilitating the flow of conductive material from the transversely extending pins which pass therethrough to the connector 18 on the layer or ply of insulation material 2.

Figure 5:
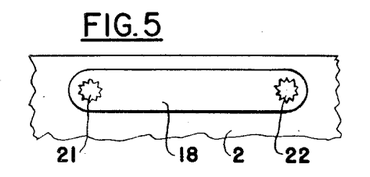
Fig. 5 illustrates a further modified form of conductive surface coating for the laminated sheets of insulation material and the modified means which I provide for establishing connection between the transverse pins and the conductive coating on the insulated sheet.

In Fig. 5 I have illustrated the conductive connector 18 deposited upon insulation layer or ply 2 with perforations 21 and 22 passing through opposite ends thereof where each of the perforations are serrated or provided with a multiplicity of inwardly extending, radially disposed portions which serve as spaced peaks establishing connection with the surface of the transversely extending pins which pass therethrough and facilitating the flow of conductive material from the pins to the connector 18.

Other shapes and forms may be imparted to the perforations which are formed in the individual layers or plies to facilitate the flow of metallic material from the transversely extending pins to form a junction or union with the connector 18.

In Fig. 1 I have illustrated the application of my invention to a radio receiver assembly in which circuit components, such as, resistor 23 and condenser 24 are mounted in pins 9—10 and 11—12 which extend transversely through the aligned perforations in the base 1 and the superimposed layers or plies 2, 3, and 4. Other circuit components are illustrated for purposes of explanation of my invention as mounted on the support or base 1, such as, the additional resistor 25 mounted in transversely extending pins 26, and 27, the tapped resistor 28 mounted in pins 29, 30, and 31; the additional condenser 32, mounted in transversely extending pins 33 and 34; the tube sockets, one of which is represented at 35 mounted in transversely extending pins 36, 37, 38 and 39, and the other of which is represented at 40 mounted on transversely extending pins 41, 42, and 43; the choke coil 44, the terminals of which are electrically connected to transversely extending pins 45 and 46; and the loud speaker represented at 47, the terminals of which are connected to transversely extending pins 48 and 49. The several aligned perforations in the superimposed layers or plies pass through the conductive connectors supported thereon to establish the pre-arranged electrical circuit. I have illustrated certain of these connectors at 14, 15, 50, 51, 52, 53 and 54. It will be observed that on certain of the layers or plies there are no connectors and the transverse pins pass therethrough without establishing any electrical connection although, in the more remote layers or plies on either side of the non-connecting layer or ply provision is made for the support of a connector thereon for establishing connection between the transversely extending pins.

Figures 6, 7, 8, 9, 10, 10A, 11, 11A, 12, 12A, 13, 13A, 14, 14A:
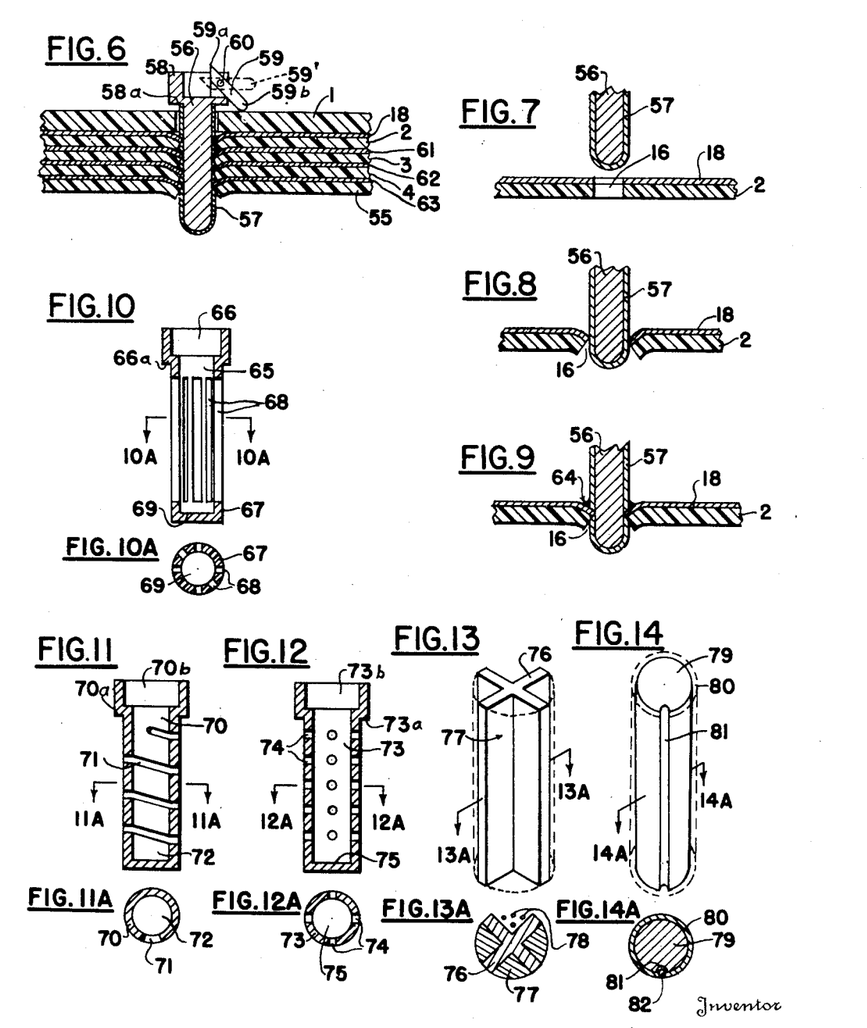
Fig. 6 is a transverse sectional view taken through one of the transversely extending pins and through the associated laminated sheets carrying the preformed circuit coating thereon and illustrating the manner of establishing connection between the transverse pin and the preformed coating on the laminated sheets.
Figs. 7, 8 and 9 are sectional views representing progressive steps in the assembly of electrical apparatus according to the system of my invention and illustrating the progressive entry of the transverse pin through the preformed conductively prepared lamination and the manner of flowing the surface coating on the transverse pin into integral relation with the surface coating on the conductive prepared circuit layout carried by the lamination of insulation material.
Fig. 10 is a vertical sectional view taken through a modified form of transverse pin used in the system of my invention where the pin serves as a receptacle-like carrier for a charge of solder.
Fig. 10A is a transverse sectional view taken on line 10A—10A of Fig. 10.
Fig. 11 represents a modified form of transverse pin which may be employed in the system of my invention, the pin having a spiral slot throughout the length thereof for the discharge of solder from the interior of the receptacle-like pin into the conductively coating laminations under conditions of heat.
Fig. 11A is a transverse sectional view taken on line 11A—11A of Fig. 11.
Fig. 12 is a vertical sectional view taken through a further modified form of transverse pin having a receptacle-like cylindrical body portion perforated throughout its length for the seepage of solder interiorly carried by the receptacle-like pin into the conductive laminations of the apparatus unit.
Fig. 12A is a transverse sectional view taken on line 12A—12A of Fig. 12.
Fig. 13 is a perspective view of a further modified form of keying pin which may extend transversely through the laminations of insulation material with longitudinally extending side grooves therein, adapted to serve as carriers for solidified solder which may be caused to flow into the conductive coatings formed on the laminations of insulation material upon the application of heat.
Fig. 13A is a transverse sectional view taken on line 13A—13A of Fig. 13.
Fig. 14 is a perspective view of a further modified form of transverse pin which may be employed in the system of my invention in which a longitudinally extending groove is provided in the pin for the insertion of a wire connector from a circuit component, the pin carrying a coating of solder thereon which may be caused to flow into the conductive coatings of the laminations of insulation material under conditions of heat.
Fig. 14A is a transverse sectional view taken on line 14A—14A of Fig. 14.

Referring to Fig. 6, I have illustrated in enlarged section the relation of the supporting plate 1 to the superimposed layers or plies 2, 3, and 4 of insulation material. I have also shown an additional layer or ply 55 in stacked arrangement with respect to the aforesaid layers or plies. In the particular section illustrated, each of the layers or plies supports an electrically conductive deposit which may extend either laterally or longitudinally with respect to the transversely extending pin which I have illustrated at 56. It will be observed that the transversely extending pin 56 serves as a carrier for a layer or ply of metal 57 of low temperature melting point, such as, solder or metal of high electrical conductivity but capable of flowing to form an electrical and mechanical bond under the action of induced heat or baking or other heat treatment. In the particular pin illustrated in Fig. 6, I have shown a substantially cup-shaped or cylindrical extension 58 forming a shoulder 58a on the upper end thereof which is radially slotted at one side thereof to receive the locking lever member 59 which is pivotally mounted as represented at 60 in the side thereof. The lever 59 has an engaging tooth 59a on the end thereof that projects into the socket-like head 58 of pin 56 and has a finger or tool-engaging end 59b projecting exteriorly. The circuit component having a terminal or pin member thereon may be supported by and electrically connected to the socket-like extremity 58 of pin 56 by allowing the terminal or pin to enter the socket-like terminal 58, and then engaging such pin or terminal by movement of the end 59b of lever 59 from the full line to the dotted line position 59' as shown. Thus the circuit component is firmly mechanically and electrically connected with the pin 56 and may be subsequently soldered therein.

I have shown the insulated layer or ply 2 as carrying the connector 18 in strip-like form, as explained in connection with Figs. 3, 4 and 5. The insulated layer or ply 3 is shown supporting the connector 61. The insulated layer or ply 4 supports the conductive connector 62. The insulated layer or ply 55 supports the connector 63. The aligned perforations in the superimposed layers or plies are forced slightly forward, as represented in Fig. 6, with the peripheral portions of the connectors 18, 61, 62 and 63 mechanically wiping the metallic surface or skin 57 of pin 56. The final assembly of the transversely extending pin 56, with respect to the superimposed layers or plies is shown in Fig. 6 just prior to the heat treatment or induced heating treatment. After the baking or heat treatment or induced heating process, the metal surface or skin 57 is caused to flow into the connectors 18, 61, 62 and 63 establishing bonding electrical connection therewith of high electrical conductivity.

Fig. 7 is a theoretical view illustrating the approach of pin 56 toward the perforation 16 through the connector 18 and insulated layer or ply 2. Fig. 8 illustrates the next progressive step in the fabrication of the electrical apparatus, using the principles of my invention, where pin 56 has advanced to a position penetrating perforation 16 where the conductive coating or skin 57 forms wiping electrical connection with the peripheral edge of the perforation through the connector 18. Fig. 9 illustrates the condition wherein the baking, heat treatment or induced heating process has caused the envelope or skin of the metallic coating 57 of low temperature melting point to flow to the position illustrated at 64 to form an electrically conductive bond between the pin 56 and the connector 18. Fig. 9 is presented for illustrative purposes and it is realized that the thickness of the metal remaining as part of coating 57 may be substantially less than the original thickness illustrated in Figs. 7 and 8. For purposes of illustrating my invention, however, it will be understood that the baking, heat treating or induced heat process causes a transfer of metal from the surface of pin 56 to the peripheral edge of connector 18 forming an electrically conductive bond therewith.

Various forms of transversely projectable pins may be employed for feeding metal of low temperature melting point from the transversely extending pins to the connectors within the laminations under the action of baking, heat treatment or induced heating. Several forms of such fountain-like transversely extending connectors embodying my invention have been illustrated in Figs. 10-14.

In Fig. 10 I have shown the transversely extending member formed from tubular material 65 having an enlarged cup-shaped end 66 thereon forming a shoulder 66a and receiving a pin or terminal portion of a circuit component and an extended cylindrical portion 67 which projects through the laminated layers or plies 2, 3, 4, 55, etc. The cylindrical shank of the transversely extending member is provided with a multiplicity of longitudinally extending radially disposed slots 68. The slots 68 may serve as carriers for solder or metal of low temperature melting point or the slot 68 may form passages through which solder or low temperature melting point metal supported in the closed end 69 of the transversely extending member 65 may be caused to flow or extrude through to the connectors 18, 61, 62, 63, etc., for establishing bonding connection therewith.

In Fig. 11 the transversely extending member is shown in the form of a tube 70 projectable through the superimposed laminations and having spiral slot 71 formed therein. The spiral slot 71 may serve as a carrier for solder or metal of low melting point or the slot 71 may provide a passageway through which solder, deposited into the transverse member 70 and supported therein by the closed end 72 thereof, may be caused to flow or extrude into the connectors 18, 61, 62 or 63. The top of tubular member 70 is enlarged to form shoulder 70a and a cup-shaped portion 70b for receiving a connecting member leading to a circuit component.

In Fig. 12 I have shown an arrangement of a transversely extending member similar to the forms shown in Figs. 10 and 11 but in which the tubular shank 73 is provided with radially disposed holes or perforations 74. These holes or perforations 74 may serve as carriers for solder or metal of low melting point or form passageways through which metal may be caused to flow or extrude into the connectors 18, 61, 62, 63, etc. The end of the tubular member 73 is closed, as represented at 75, to facilitate the holding of solder or metal of low melting point within the transverse member so that the transverse member serves as a fountain supply for solder. The tubular member 73 has a shoulder 73a formed on the upper end thereof and terminates in a cup-shaped or cylindrical portion 73b for receiving a connecting member extending from a circuit component supported on base 1.

In Fig. 13 I have illustrated a modified form of transverse member having a section in the form of a cross, as represented at 76, formed from metallic material in the quadrantal portions of which accumulations of solder or metal of low melting point is supported, as represented at 77. One of the quadrantal portions serves as a passageway for one or more conductors 78 leading to a circuit component supported on the plate 1. The top of the member 76 serves as a connecting and supporting means for the desired circuit component. Upon insertion of the transverse member 76 through the laminations, and baking, heat treatment or the induced heating of the circuits, the accumulated solder or metal of low melting point 77 is caused to flow into the connectors 18, 61, 62 and 63, etc.

In Fig. 14 I have illustrated a further modified form of transverse member in which metallic pin 79, having a coating of solder or metal of low melting point 80 thereon is adapted to project through the laminations. Longitudinally extending groove 81 is provided on pin 79 to permit the entry of a connecting wire or wires 82 therein leading to a circuit component. Upon baking, heat treatment or induced heating of the pin assembly the solder or metal of low melting point is caused to flow around conductor 82 and into connectors 18, 61, 62 and 63 forming a substantial electrical bond.

Figure 15:
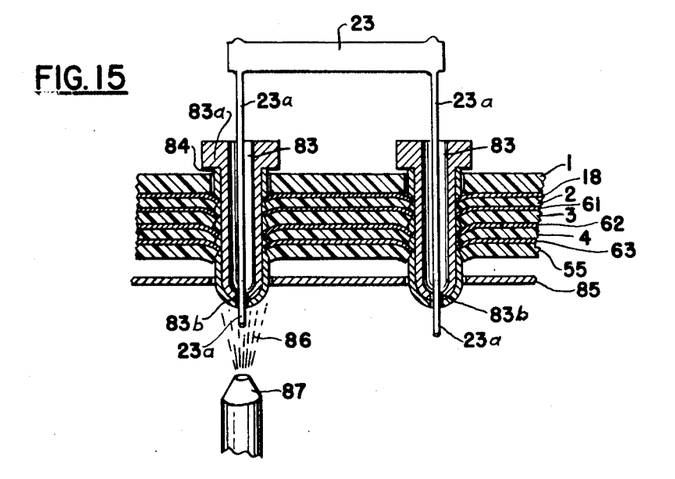
Fig. 15 is a transverse sectional view taken through a multiplicity of laminations of insulation material, each carrying prearranged conductive coatings thereon adapted to be interconnected by surface coatings carried by the transversely extending pins with provision for establishing connection with wire elements extending from certain circuit components by a hot spray of metal adequately shielded from the laminations during the spraying process.

In Fig. 15 I have illustrated a further modified form of my invention wherein the transverse members are tubular in form, as represented at 83. These tubular members have a surface coating 84 of solder or metal of low melting point and may be inserted through the laminations and maintained in position with respect thereto by shoulder 83a. The end of tubular member 83 is apertured at 83b, thereby permitting the wire connector 23a from the resistor 23 to be projected therethrough. With the wire connectors 23a projecting through, the ends of the transverse members 83, a shield member 85 is moved to a position over the projecting ends of the transverse members 83 and a spray of metal, represented at 86, shot from nozzle 87 deposited over the perforated end 83b and projecting conductor 23a for forming an electrical and mechanical bond between the conductor 23a and the transverse member 83. The metallic spray 86 is prevented from reaching the laminations by means of the shield 85 which is subsequently removed. The spray process is generally performed subsequent to the baking, heat treatment or induced heating process by which metallic coating 84 is caused to flow into the connectors 18, 61, 62 and 63, etc.

Figure 16:
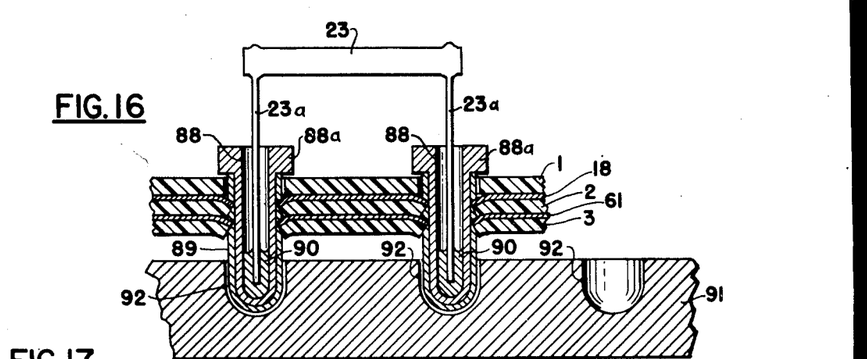
Fig. 16 is a transverse sectional view through a modified arrangement of interconnecting means for the conductively coated laminations in which specially prepared transverse pins serve as receptacles for the charge of solder and in which a preformed hot plate designed for use in the production process of a prearranged circuit connection for an electrical unit, serves to impart heat to the transverse pins for flowing solder both interiorly and exteriorly of the pins for compositely establishing connections with a circuit component as well as with the conductive coatings carried by the laminations of insulation material.

In Fig. 16 I have shown the transversely extending members formed as closed tubes 88 having a shoulder 88a thereon adapted to abut against the top supporting plate or lamination 1 for supporting the transverse member along an axis substantially normal to the planes of the laminations 2, 3, etc. The tubular members 88 carry a film or layer of solder or metal of low temperature melting point represented at 89 exteriorly of the tubular member. Also, the tubular member, being closed at the end thereof, serves as a cup or container or carrier for the solder 90 interiorly of the tubular member 88. In order to effect a connection between the depending lead wires 23a leading from the circuit component, such as, resistor 23, with the transverse members 88, and at the same time effecting a flow of the solder or metal of low temperature melting point constituting the film 89, I provide a recessed hot plate 91 having prearranged recesses 92 therein. The recesses 92 are so spaced that the transverse members 88 may be projected into the recesses 92 according to a prearranged pattern. In a production process embodying the principles of my invention the exact positions at which the transverse members 88 project is predetermined so that the exact positions of the recesses 92 can be correspondingly prearranged. Plate 91 may be electrically heated, steam heated or otherwise maintained at a temperature sufficient to reduce the film 89 exteriorly of transverse members 88, and the charge 90 interiorly of the transverse members 88 to a molten state to effect the flow of the metal constituting film 89 into the metallic connectors 18, 61, etc., carried by laminations 2, 3 etc., and thereby quickly completing an apparatus assembly with electrical connections permanently established between circuits components and the circuit connectors carried by the laminations.

Figure 17:
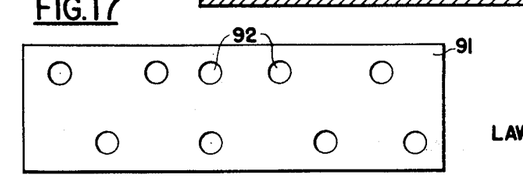
Fig. 17 is a plan view of the hot plate illustrated in section in Fig. 16 and showing the prearrangement of the pockets in the hot plate for receiving the ends of the transverse pins.
Figure 18:
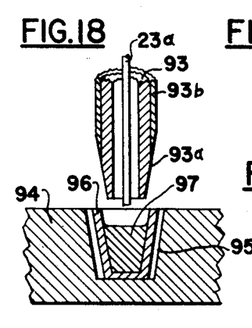
Fig. 18 is a transverse sectional view taken through a further modified form of pin connector adapted to pass through laminations carrying the circuit of the apparatus unit which is formed by the production process of my invention and illustrating a capping method of interconnecting a wire from a circuit component with the pin.

In Figs. 18–21 I have illustrated a modified method and apparatus for establishing quick electrical connection between the transverse members, the connectors carried by the laminations of insulation material, and the connectors extending from the circuit components. In this arrangement the transverse members are represented in the form of a tube 93 having a tapered external end 93a and carrying a film of solder or metal of low temperature melting point as represented at 93b. The tubular transverse member 93 may have the wire connector 23a or a multiplicity of connectors extending therethrough. A pre-arranged pattern plate 94 is provided having recesses 95 therein arranged in predetermined spaced relation over the surface of the pattern plate 94. The recesses 95 are tapered in conformity with the tapered ends 93a of the transverse member 93. These tapered recesses 95 serve as carriers for frusto-conical cap members 96 which are distributed into the recesses 95 of plate 94 in alignment with the ends of the transverse members 93. The frusto-conical cap members 96 each serve as containers for the solder or metal of low temperature melting point represented at 97. The electrical equipment having the transverse members 93 projecting from the laminations thereof is caused to move downwardly in a suitable jig from the position illustrated in Fig. 18 to a position in which the tapered end 93a of transverse member 93 engages the interiorly tapered wall of the cap member 96. To unite the cap members 96 with the tapered ends 93a of transverse members 93 the preformed pattern plate 94 may be mounted in a jig and moved upwardly to force the cap members 96 over the protruding ends 93a of transverse members 93. The diameter of each recess 95 is sufficiently large as to allow sufficient lost motion for self-adjustment or slight displacement of cap members 96 within the sockets or recesses 95 as to properly center the cap members 96 over the protruding ends 93a of transverse members 93. The pre-arranged pattern plate 94 is recessed in the same manner as explained in connection with hot plate 91 in Figs. 16 and 17 so that the solder or metal of low temperature melting point 97 is molten and establishes bonding relation between the conductor or conductors 23a, the transverse member 93, and the cap member 96.

Figure 19:
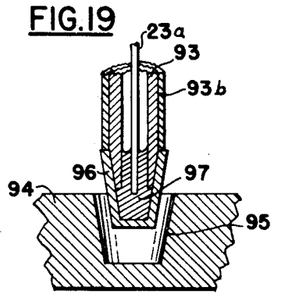
Fig. 19 illustrates the completed capped position for the end of the pin and the wire connector which extends therethrough in the manner previously shown in Fig. 18.
Figure 20:
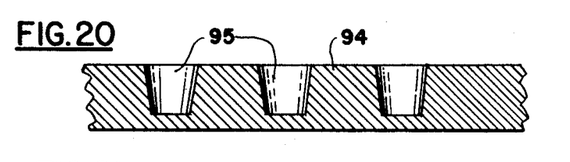
Fig. 20 is a cross-sectional view through the heating plate employed in the process illustrated in Figs. 18 and 19.
Figure 21:
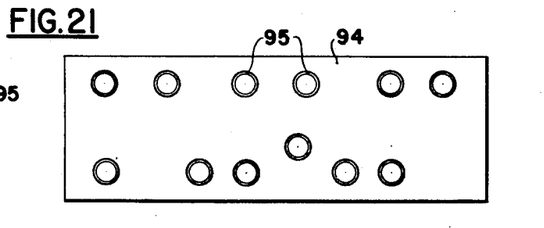
Fig. 21 illustrates the arrangement of cavities in the capping plate 20, which I provide in carrying out the capping and soldering process illustrated in Figs. 18 and 19.

In Fig. 19 I have shown the completed juncture and the separation of the transverse members from the prearranged pattern plate 94.

Figure 24:
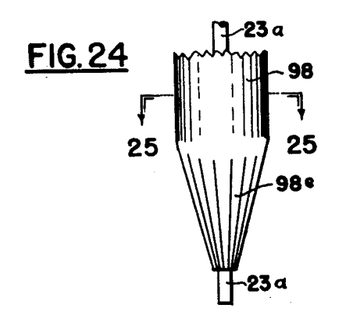
Fig. 24 is a fragmentary side elevational view of a transverse member crimped with respect to the connecting element leading to the circuit component.
Figure 25:
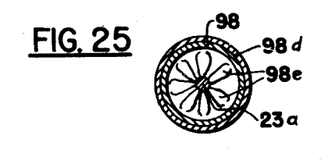
Fig. 25 is a horizontal sectional view through the crimped connector of Fig. 24 taken on line 25—25 thereof.

In Figs. 22-26 I have illustrated a further modified arrangement of bonding means according to the principles of my invention wherein the transverse member is formed by an open metallic tube 98 having a shoulder 98a which permits the tube to be supported in abutting relationship to supporting plate 1 and project through the aligned apertures in the laminations. The tube 98 is provided with a thin-walled terminus 98b interiorly of which there is carried a film of solder or low temperature melting point metal represented at 98c. The exterior of the tubular member 98 carries a coating of solder or metal of low melting point represented at 98d throughout the length of the tubular member. An anvil plate member 99 having a multiplicity of spaced recesses 100 therein is disposed immediately beneath the protruding ends of the tubular members 98. The recesses 100 are tapered in from and provided with a corrugated surface against which the protruding cylindrical end of the tubular member 98 may be crimped by mutual movement between the laminated structure constituting the electrical apparatus and the anvil plate member 99. This crimping action results in the uniting of the tubular member 98 with the conductor 23a as represented in Figs. 24 and 25, wherein the tubular member 98 has the end thereof crimped in tapered arrangement against the conductor 23a as represented at 98e. The anvil plate member 99 is subjected to heat in a manner similar to the heating of plates 91 and 94 causing a flow of solder or metal of low melting point from the film 98c internally of the tubular member 98 and from the film 98d into the connectors 18, 61, 62, etc., intermediate the laminations 2, 3, 4, etc.

Figure 22:
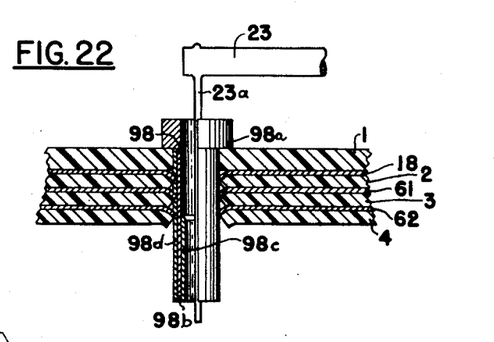
Fig. 22 is a cross-sectional view through a further modified form of transverse connecting member extending through the laminations wherein the connecting member may be crimped in position to establish connection with a connecting member extending from a circuit component (the figure also illustrates the crimping die employed for crimping the transverse member)
Figure 23:
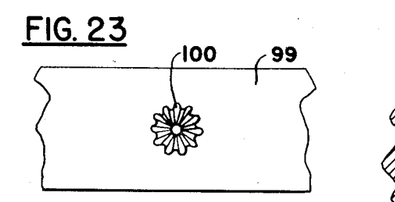
Fig. 23 is a plan view of the crimping die illustrated in Fig. 22.
Figure 26:
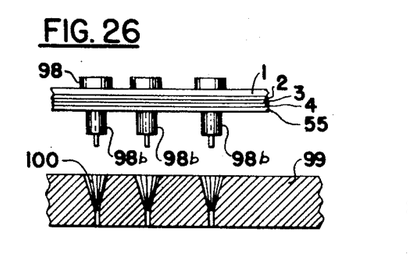
Fig. 26 is a view illustrating a multiplicity of connectors in an electrical apparatus assembly preparatory to a crimping operation.

In Fig. 26 I have illustrated the manner in which a multiplicity of transverse members of the structure illustrated in Fig. 22 are simultaneously crimped by relative movement of the laminated structure with respect to the anvil plate member 99. In effecting the crimping action, suitable abutment means are applied against the upper extremities of the shoulder 98a of each of the tubular members 98 to prevent displacement thereof under conditions of appreciable pressure against the transverse members.

Figure 27:
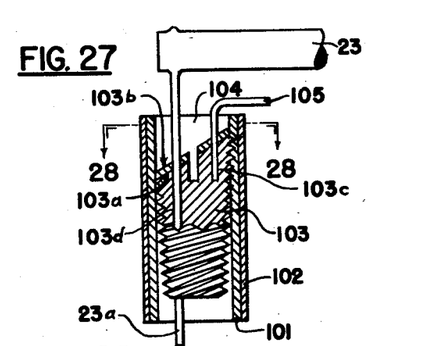
Fig. 27 is a side elevational view of a repair plug device used in the apparatus assembly of my invention wherein the plug and the transverse tubular member, through which the plug passes, is illustrated in section.
Figure 28:
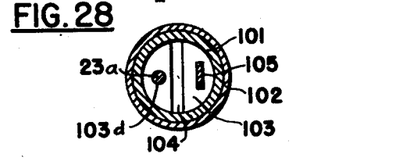
Fig. 28 is a horizontal sectional view taken substantially on line 28—28 of Fig. 27.

In Figs. 27-28 I have illustrated a modified form of my invention which is particularly suitable for repair operations on electrical apparatus. The transverse member is illustrated in the form of an open-ended tube 101 having a coating of solder or metal of low melting point 102 thereon adapted to flow into the conductors carried by the laminations under conditions of heat treatment. The interior of the open-ended tube 101 is engaged by a screw-threaded metallic plug 103. The screw-threaded metallic plug 103 is frusto-conical in shape, having screw threads on the external periphery thereof engageable with the interior wall of open-ended tube 101. The tapered construction of the screw-threaded plug 103 facilitates introduction of the plug into the open-ended tube. The upper end of the plug 103 is provided with a diametrical slot 104 into which the end of a tool, such as a screwdriver, may be introduced for rotating the plug 103 for fitting the plug into the interior of the open-ended tube 101 in such manner that the screw threads thereon bite into the metal of the tube 101.

The upper end of plug 103 is disposed in an inclined plane represented at 103a on the upper surface of which a layer of solder or metal of low temperature melting point—represented at 103b—is carried. The plug 103 may be slotted at 103c to receive the connecting lug 105 which may lead to an electrical circuit component. The plug 103 may be longitudinally apertured at 103d for the passage of the wire connector 23a leading to the circuit component 23. The structure of the plug 103 is such that the wire connector 23a may be introduced either from above or from below the laminations through which the tubular member 101 extends. Heating of the plug 103 within the tubular member 101 results in the flow of the layer of solder 103b to form a union between the plug 103 and the interior of the tubular member 101 and the wire connector 23a.

Figure 29:
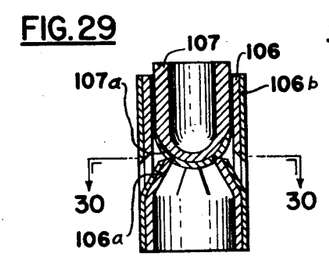
Fig. 29 is a vertical sectional view through a modified form of transverse member adapted to slidably receive a pin connector and establish electrical connection therewith.
Figure 30:
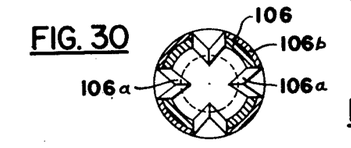
Fig. 30 is a horizontal sectional view on line 30—30 of Fig. 29.

In Figs. 29 and 30 I have illustrated a further modified form of transverse member of the tubular type extending through the laminations of the electrical apparatus. In this arrangement the tubular member is represented at 106 having a multiplicity of instruck lugs or teeth 106a pressed inwardly therefrom and forming upstanding teeth or abutments for the pin terminal 107 of electrical apparatus, such as an electron tube. In this embodiment of my invention the transverse tubular member 106 has an external coating of solder or metal of low temperature melting point shown at 106b. Similarly, the tip of pin terminal 107 has a coating of solder or metal of low temperature melting point represented at 107a. When the transverse tubular member 106 is passed through the laminations and the laminations subjected to heat treatment prior to the insertion of pin terminal 107 into the interior of the tubular member, the metal flows from the tubular member into the conductive paths between the laminations. Thereafter, when the pin terminal 107 is inserted through the sleeve-like transverse member 106, connection is established between the lugs 106a and the soft metal 107a on the bottom of the pin terminal 107.

Figure 31:
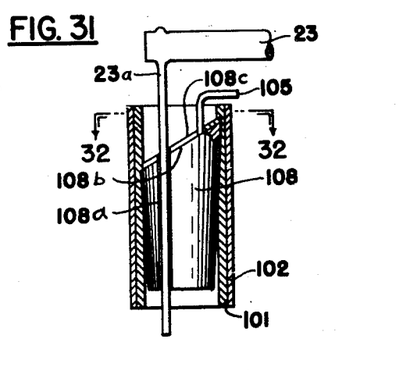
Fig. 31 is a side elevational view of a modified form of plug for assembly or repair of an electrical apparatus of the laminated sheet type embodying my invention, having parts illustrated in section.
Figure 32:
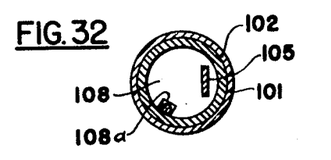
Fig. 32 is a horizontal sectional view taken on line 32—32 of Fig. 31.

Figs. 31 and 32 illustrate the form of connector which may be used in the repair of electrical apparatus of the laminated sheet structure in a manner very similar to the device shown in Figs. 27 and 28, except that in the form shown in Figs. 31 and 32 a plug 108 is employed which is smooth walled instead of being screw-threaded, as in the form of my invention shown in Figs. 27 and 28, and the wire-receiving facility is in the form of a longitudinal slot 108a rather than a passage extending longitudinally through the plug device. The plug device is provided with the connecting lug 105 in a manner similar to the plug of Figs. 27 and 28. The upper end of the plug 108 is inclined as represented at 108b and carries the layer of solder or metal of low temperature melting point—represented at 108c—which is free to constitute a junction between the plug 108 and the inner wall of the tubular member 101 and the wire connector 23a under conditions of heat treatment at the same time that the flow of solder or metal of low temperature melting point occurs between the coating 102 and the conductive layers intermediate the laminations of insulation material.

Figures 33, 35, 36:
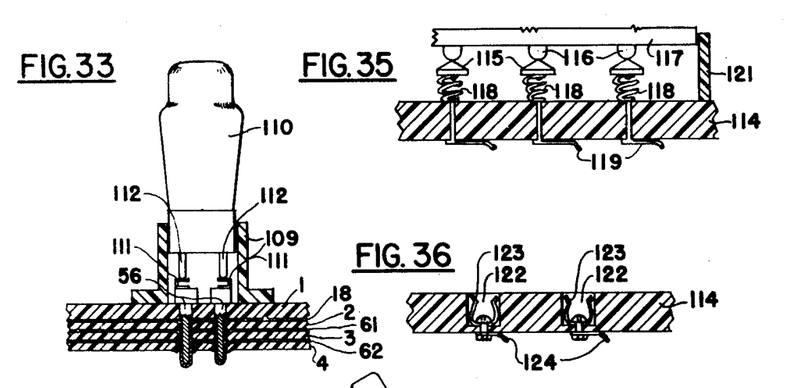
Fig. 33 is a side elevational view of an electron tube insertable into a socket structure which may be mounted on the insulated base of the laminated structure employed in the apparatus assembly of my invention.
Fig. 35 is a transverse sectional view taken through one form of test board, illustrated in Fig. 34 and showing resiliently mounted contact members with which terminal pins on the chassis of the laminated apparatus assembly may establish quick electrical connection for performing electrical circuit continuity tests.
Fig. 36 is a sectional view taken through a modified form of test board and arrangement of contacts thereon.

The conductors which provide connecting means for the conductive layers intermediate the insulation pins serve as efficient connectors for the terminal members of electron tube sockets represented generally in Fig. 33 at 109. Such sockets may be supported directly upon the base of insulation material 1 for supporting the electron tube 110. The conductive members 56 constituting the transverse members interconnecting the conductive layers 18, 61, 62, etc., terminate in spring contact members represented at 111, with which the pin terminals 112 of electron tube 110 establish connection.

Figure 34:
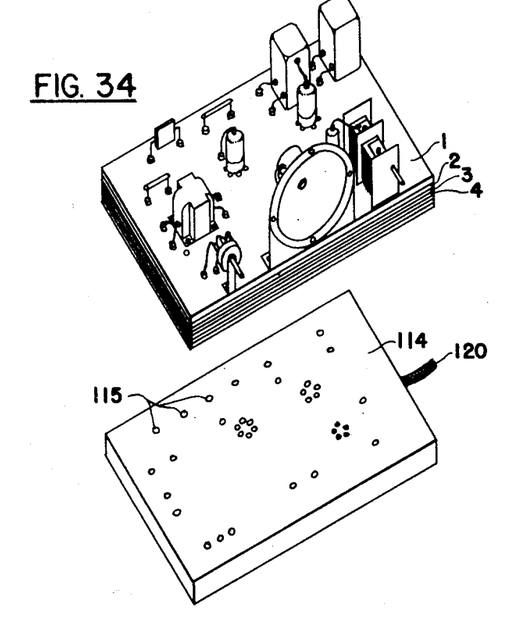
Fig. 34 is a perspective view of a complete chassis assembly according to the system of my invention and showing the relation thereof to a test board for rapidly testing circuit continuity and performance of an electrical apparatus, such as a radio receiver without the employment of individually movable test prods.

In Figs. 34, 35, and 36 I have illustrated one of the methods of rapid testing of electrical apparatus constructed in accordance with the method of my invention. Fig. 34 illustrates in perspective view an assembled chassis of a radio receiver from laminated sheets 1, 2, 3, 4, etc. from the bottom of which pin terminals extend as represented more clearly in Fig. 35. The electrical components are represented in perspective view on the top of base 1 of the chassis, electrically connected by the pin terminals that project from the underside of the chassis in a pre-determined pattern. By reason of this pre-determined pattern arrangement of the pin terminals I am able to provide the test board represented at 114 having contacts thereon which I have designated at 115 arranged in pre-determined alignment with the contacts 116 projecting from the chassis of the radio receiver designated generally at 117 in Fig. 35. The contacts 115 on the test board 114 are each spring mounted as represented at 118 and connected to lug members 119 which extend to a circuit continuity testing system through cable represented generally at 120. Inasmuch as contacts 115 are mounted in pre-determined pattern relation by springs 118, it is possible to make a quick circuit continuity test by pressing the chassis 117 into a position illustrated generally in Fig. 35 in which contact 116 makes connection with contact 115 coupled by springs 118. Various test boards may be utilized where each test board is applicable to a broad or generic class of electronic equipment and where any given equipment within that class would utilize only the contacts pertinent to its test when it is applied to the test board. For example, one test board could be developed for radio superheterodyne receivers and developed so broadly as to cover a whole line of such receivers. When a five tube "economy" superheterodyne is to be tested it would utilize only a few of the test connections, i. e. mixer, one I.-F. amplifier, a second detector, an audio amplifier and a rectifier. When a 22 tube "custom built" superheterodyne is to be tested it may utilize every contact of the test board, i. e., several R.-F. amplifiers, first detector, local oscillator, several I.-F. amplifiers, etc. A guide 121 is associated with test board 114 so that chassis 117 can be quickly centered with respect to the contacts for speeding circuit testing of each assembled chassis without the necessity of using prods which require the expenditure of so much time in apparatus inspection.

In lieu of the arrangement of spring mounted contacts on the test board illustrated in Fig. 35, I may provide the arrangement illustrated in Fig. 36 in which the test board 114 is provided with a multiplicity of pre-arranged sockets 122 in each of which spring jaw contact devices 123 are arranged. These spring jaw contact devices 123 are supported within the recesses 122 and are fastened to the insulation material of the test board 114. The contact devices lead through connectors 124 to the test board indicating equipment. The radio receiver chassis, when inserted over the test board 114 has the pin terminals 116 thereof engaged in the spring contact jaws 122, enabling quick electrical testing of the equipment without the use of prods necessary in prior art test structures.

The solder or metal of low melting point, which is used throughout the several forms of my invention for flowing the conductive matter from the transverse member into the conductive layers carried between the laminations and flowing the conductive material internally of the transverse member for establishing connection between the circuit component and the transverse member, is formed from an alloy which is solid at temperatures of the order of 200° F. and which flows at temperatures of the order of 350° F. for establishing an electrical bond with the conductive coatings or connections to the circuit components. A variety of such alloys may be used, among which I may mention: Lipowitz's, Wood's, Darcet's, Cliche metal, Rose's, Bismuth solder, and alloys of lead and tin which may have a suitable flux associated therewith.

The several circuit conductors in the apparatus assembly of my invention have been illustrated as carried by successive laminated sheets. Where desirable, an electrical shielding may be effected by introducing electrical shields intermediate the laminations. The complete assembly constituted by the laminated sheets may be sealed along the peripheral edges thereof by application of a moisture proofing compound which may also protect the assembly against fungus growth. The method of my invention contemplates the application of automatic machinery in the handling of the laminations, perforation thereof, application of conductive coatings thereto, stacking thereof, insertion of the transverse conductive members therethrough, the clamping of the laminations together as a unit, and the operating and moisture proofing thereof through and including automatic testing operations.

The method of assembly of electrical apparatus, according to my invention as herein set forth, has many advantages, among which are:

1. The exact length of the connecting circuits is known in advance—this is important because the final performance of the apparatus may be predicted and computed more closely. The close tolerances required in television apparatus make the assembly process of my invention particularly suitable for such apparatus.

2. The exact geometrical arrangement of conductors is assured by the process of my invention, thus providing better performance due to the fact that magnetic fields for each electrical circuit may be predetermined and compensated for in the arrangement of electrical circuit components.

3. Repair and replacement of electrical circuit components will not disturb the electrical conductors as to length or geometrical arrangement of the wiring circuit.

4. The laminated structure and conductors carried thereby permits better shielding of circuits by the introduction of shielding laminations in association with the laminations of insulated material.

5. The assembly reduces the possibility of human errors by operative and insures high precision in manufacture.

6. A better seal can be provided along the edges of the laminated sheets for completely sealing the apertures against seepage of moisture and against fungus growth.

7. Production of electrical apparatus, according to the method of my invention, is greatly speeded up and the costs reduced.

While I have described my invention in various preferred embodiments, I realize that further modifications of my invention may be made and I desire that it be understood that no limitations upon my invention are intended other than may be imposed by the scope of the appended claims.

What I claim as new and desire to secure by Letters Patent of the United States is as follows:

1. A method of electrically connecting a plurality of circuit components which includes the steps of forming tubular electrically-conductive members having their external surfaces coated with an electrically-conductive bonding material capable of being flowed upon the application of heat, applying circuit connectors to a plurality of sheets of insulating material, superimposing said sheets to form a laminated unit, forming holes in said laminated unit through one or more of said circuit connectors of smaller size than the diameter of said coated conductive members, forcing said conductive members through said holes so that their ends project from said laminated unit, applying heat to said members to cause said bonding material to flow and form an electrical and mechanical bond between each member and each circuit connector through which it passes, passing the leads from the circuit components through said tubular members, and bonding said leads to said members on the opposite side of said laminated unit from said circuit components.

2. A method of electrically connecting a plurality of circuit components including the steps of applying circuit connectors on a plurality of sheets of resilient insulating material, superimposing said sheets to form a laminated unit, forming holes in said unit each passing through one or more of said circuit connectors, coating the external surfaces of tubular electrically-conductive pins with an electrically-conductive bonding material capable of flowing on the application of heat, the diameter of said coated pins being greater than the width of said holes, forcing said pins through said holes, heating said pins to cause said bonding material to fuse to the circuit connector or connectors through which it passes, the resilience of said laminated sheets forcing the portions of said connectors surrounding said holes into engagement with said pins during fusing, passing the leads from said circuit components through said pins, and simultaneously bonding said leads to said pins by pot dipping the ends of said pins and leads.

3. A method of electrically connecting a plurality of circuit components including the steps of applying circuit connectors on a plurality of sheets of resilient insulating material, superimposing said sheets to form a laminated unit, forming holes in said unit each passing through one or more of said circuit connectors, coating the external surfaces of tubular electrically-conductive pins with an electrically-conductive bonding material capable of flowing on the application of heat, the diameter of said coated pins being greater than the width of said holes, forcing said pins through said holes so that their ends project from said holes, heating said pins to cause said bonding material to fuse to the circuit connector or connectors through which it passes, the resilience of said laminated sheets forcing the portions of said connectors surrounding said holes into engagement with said pins during fusing, passing the leads from said circuit components through said pins, placing a shield over the projecting ends of said pins and leads with said pins and leads projecting therethrough, and spraying said leads and pins with metal.

LAWRENCE H. TAYLOR.

REFERENCES CITED

The following references are of record in the file of this patent:

UNITED STATES PATENTS

| Number | Name | Date |
| --- | --- | --- |
| 762,840 | Osborn | June 14, 1904 |
| 913,024 | Meacham | Feb. 23, 1909 |
| 1,188,056 | Faile | June 20, 1916 |
| 1,694,149 | Vawter | Dec. 4, 1928 |
| 1,862,275 | Menut | June 7, 1932 |
| 1,865,051 | Trane | June 28, 1932 |
| 1,892,146 | Harshberger | Dec. 27, 1932 |
| 1,936,404 | Miner | Nov. 21, 1933 |
| 1,939,130 | Mills | Dec. 12, 1933 |
| 2,015,316 | Miller | Sept. 24, 1935 |
| 2,066,876 | Carpenter | Jan. 5, 1937 |
| 2,093,810 | Karmazin | Sept. 21, 1937 |
| 2,113,060 | Sandberg | Apr. 5, 1938 |
| 2,244,009 | Hiensch | June 3, 1941 |
| 2,433,384 | McLarn | Dec. 30, 1947 |
| 2,442,968 | Bierwirth | June 8, 1948 |